United States Patent [19]
Calhoun et al.

[11] Patent Number: 5,888,650
[45] Date of Patent: *Mar. 30, 1999

[54] TEMPERATURE-RESPONSIVE ADHESIVE ARTICLE

[75] Inventors: Clyde D. Calhoun; Joaquin Delgado, both of Stillwater, Minn.

[73] Assignee: Minnesota Mining and Manufacturing Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 657,235

[22] Filed: Jun. 3, 1996

[51] Int. Cl.$^6$ .................................................. C09J 7/02
[52] U.S. Cl. ............................ 428/354; 428/355 RA; 428/355 AC
[58] Field of Search ................................ 428/343, 354, 428/355 AC, 355 RA

[56] References Cited

U.S. PATENT DOCUMENTS

| | | | |
|---|---|---|---|
| 2,532,011 | 11/1950 | Dahlquist et al. | 154/53.5 |
| 3,144,399 | 8/1964 | Rainer et al. | 204/154 |
| 3,240,330 | 3/1966 | Christmas | 206/69 |
| 3,318,852 | 5/1967 | Dixon | 260/78.5 |
| 3,635,754 | 1/1972 | Beede . | |
| 3,691,140 | 9/1972 | Silver | 260/78.5 |
| 3,772,224 | 11/1973 | Marlin et al. | 260/2.5 |
| 3,849,156 | 11/1974 | Marlin et al. | 117/10 |
| 3,967,031 | 6/1976 | Lambert | 428/294 |
| 3,978,274 | 8/1976 | Blum | 428/476 |
| 4,166,152 | 8/1979 | Baker et al. | 428/522 |
| 4,359,502 | 11/1982 | Caponigro . | |
| 4,378,393 | 3/1983 | Smuckler . | |
| 4,418,120 | 11/1983 | Kealy et al. | 428/343 |
| 4,438,177 | 3/1984 | Potter . | |
| 4,554,324 | 11/1985 | Husman et al. | 525/301 |
| 4,629,663 | 12/1986 | Brown et al. | 428/343 |
| 4,731,273 | 3/1988 | Bonk . | |
| 4,786,696 | 11/1988 | Bohnel | 526/88 |
| 4,820,561 | 4/1989 | Pithouse . | |
| 4,822,687 | 4/1989 | Kessel et al. | 428/447 |
| 4,889,753 | 12/1989 | Brown et al. | 428/40 |
| 5,045,569 | 9/1991 | Delgado | 521/60 |
| 5,139,832 | 8/1992 | Hayashi et al. | 428/35.5 |
| 5,144,051 | 9/1992 | Kessel et al. | 556/64 |
| 5,156,911 | 10/1992 | Stewart . | |
| 5,217,805 | 6/1993 | Kessel et al. | 428/352 |
| 5,252,395 | 10/1993 | Maruoka . | |
| 5,273,805 | 12/1993 | Calhoun et al. | 428/156 |
| 5,296,277 | 3/1994 | Wilson et al. | 428/40 |
| 5,324,564 | 6/1994 | Chiotis . | |
| 5,344,681 | 9/1994 | Calhoun et al. | 428/42 |
| 5,508,313 | 4/1996 | Delgado et al. | 521/63 |
| 5,573,848 | 11/1996 | VanPraet . | |
| 5,589,246 | 12/1996 | Calhoun . | |
| 5,614,310 | 3/1997 | Delgado . | |

FOREIGN PATENT DOCUMENTS

| | | |
|---|---|---|
| WO 96/01281 | 1/1986 | WIPO . |
| WO 93/12147 | 6/1993 | WIPO . |
| WO 95/11945 | 5/1995 | WIPO . |

OTHER PUBLICATIONS

The Wiely encyclopedia of Packaging Technology, pp. 335–338, John Wiley & Sons, (1986).

Plate and Shibaev, "Comb–like Polymers, Structure and Properties," Journal of Polymer Science–Macromolecular Reviews, 8, 117–253 (1974).

*Primary Examiner*—Jenna Davis
*Attorney, Agent, or Firm*—Lucy C. Weiss

[57] ABSTRACT

A temperature-responsive adhesive article comprises (a) a temperature-responsive carrier capable of changing its shape at a first transition temperature; and (b) a thermomorphic pressure-sensitive adhesive on at least a portion of at least one surface of the carrier, the thermomorphic pressure-sensitive adhesive being capable of changing its shape at a second transition temperature. By varying the initial shapes or topographies of carrier and adhesive and the relationship between the transition temperatures, the article of the invention can be designed to provide a wide variety of bonding and de-bonding properties.

31 Claims, 4 Drawing Sheets

TEMPERATURE-RESPONSIVE ADHESIVE ARTICLE

FIELD OF THE INVENTION

This invention relates to adhesive articles whose bonding and/or de-bonding properties can be changed on demand by a change in temperature.

BACKGROUND OF THE INVENTION

Pressure sensitive adhesive (PSA) sheets, films, and tapes are often difficult to apply to a substrate at a precise location without air entrapment or wrinkles, primarily due to preadhesion or "quick stick" behavior of the PSA. This is particularly true for "aggressive" PSAs that have high bond strengths and/or low temperature tack properties, and is especially problematic as the size of the article increases. Several methods and configurations have been developed to make the application of PSA films and tapes easier.

For example, application aids, such as formulations containing a surfactant, water, and alcohol, or dry application aids containing particles, powders, or talcs, have been used to eliminate preadhesion. Such application aids, however, tend to affect the adhesive properties of the PSA and prevent rapid formation of a strong bond between adhesive and substrate.

Discontinuous coatings of nontacky materials projecting from the adhesive surface have also been used to prevent preadhesion of the PSA during application. Articles with these coatings can be placed against a substrate and freely moved over the substrate. Such coatings include patterned polymer coatings, particles, and films, for example. Yet another configuration used to make PSA films and tapes easier to apply uses a random distribution of hollow glass microspheres partially embedded in the adhesive as a means to prevent contact and preadhesion. Pressure application crushes the microspheres, permitting the adhesive to contact the substrate and form a strong bond instantly.

Other methods of dealing with preadhesion include formation of pegs of adhesive, optionally containing beads, protruding from the PSA surface. Topographically structured adhesives have also been described. Various adhesive layer topographies include concave and convex V-grooves or hemispheres, and other three dimensional shapes. In general, these topographies provide adhesive sheets, films, and tapes with lower peel adhesion values in comparison with smooth-surfaced adhesives. In many cases, the topographically-structured adhesives also display a change in adhesion with increasing contact time.

These adhesive articles exhibit various types of positionable and repositionable behavior. Certain of these articles can suffer from problems, however. Therefore, alternative adhesive articles are needed for avoiding preadhesion when using pressure sensitive adhesives.

Furthermore, it is desirable that articles be removable from substrate surfaces on demand without damaging the substrate. Release on demand has been addressed using microsphere adhesives and tapes that release upon mechanical stretching. In spite of these approaches, however, there is a continuing need for articles which exhibit both ease of application and ease of removal.

SUMMARY OF THE INVENTION

Briefly, this invention provides a temperature-responsive adhesive article comprising (a) a temperature-responsive carrier capable of changing its shape at a first transition temperature; and (b) a thermomorphic pressure-sensitive adhesive on at least a portion of at least one surface of the carrier, the thermomorphic pressure-sensitive adhesive being capable of changing its shape at a second transition temperature. Preferably, the temperature-responsive carrier is a film (more preferably, a flexible film), and the thermomorphic pressure-sensitive adhesive comprises a continuous crystalline polymer component and a discrete crosslinked elastomeric polymer component. The term "shape," as used herein, refers to either three-dimensional shape or surface topography.

The article of the invention comprises both a carrier and an adhesive which are each capable of transitioning between, e.g., a structured surface topography and an essentially unstructured surface topography. (As used herein, the term "essentially unstructured" refers to a less structured, relatively smooth topography, in comparison with the alternative "structured" topography.) The transitions between topographies can occur at the same temperature for both or, preferably, at different temperatures. Thus, by varying the initial topographies of carrier and adhesive and the relationship between the transition temperatures, the article of the invention can be designed to provide a wide variety of bonding and de-bonding properties.

For example, when both the carrier and the adhesive have initial topographies that are structured, the article is initially repositionable (easily attached to a substrate) and then bondable upon the application of heat (or upon irradiation, e.g., in the form of ultraviolet, infrared, microwave, or radio frequency radiation). Alternatively, easy removability can be provided when the carrier and the adhesive are each initially essentially unstructured and, upon, e.g., the application of heat, transition to structured topographies. In preferred embodiments of the invention, however, the initial topographies of the carrier and the adhesive are different (specifically, one is structured and one is essentially unstructured), and the carrier and the adhesive change topography at different temperatures. Such preferred embodiments (unlike articles of the prior art), can, upon, e.g., the application of heat, be both bondable on demand (easy to apply, due to their positionability or repositionability) and removable on demand (easy to at least partially de-bond from a substrate surface).

In this application:
"positionable" refers to an adhesive article that can be placed against a substrate and easily slid over the surface into proper position without preadhering to the substrate;

"repositionable" refers to an adhesive article that can be repeatedly applied to and removed from a substrate surface without substantial loss of adhesive properties and without damage to the substrate surface;

"topography" refers to the surface features of a carrier or an adhesive; and

"crosslinked" refers to a three-dimensional polymeric network formed by the chemical bonds between at least two polymeric chains. This term includes pseudo-crosslinking resulting from ionic bonds or reinforcing interactions, for example.

BRIEF DESCRIPTION OF THE DRAWINGS

These and other features, aspects, and advantages of the present invention will become better understood with regard to the following description, appended claims, and accompanying drawings (wherein the relative thicknesses and topographies of carrier and adhesive have been selected for purposes of illustration only and are not meant to be limited to those shown):

DETAILED DESCRIPTION

Carriers

Temperature-responsive carriers which can be utilized in making the article of the invention are those which are capable of transitioning between different shapes (changing shape) at one or more transition temperatures. Generally, such shapes will be predetermined by the thermomechanical processing history of the material. Representative examples of suitable materials include poly(ethylene); poly(propylene); poly(vinyl chloride); poly(vinylidene fluoride); polyester; polyamide; cellulose acetate; ethyl cellulose; poly(ethyl acrylate); copolymers of ethylene with acrylic acid, tetrafluoroethylene, propylene, butene, vinyl acetate, or ethyl acrylate; and the like. Such materials can be either crosslinked (e.g., through irradiation) or uncrosslinked, but crosslinked materials tend to provide more driving force for a change in shape and are therefore generally preferred.

Preferably, the temperature-responsive carrier is a film (more preferably, a flexible film) having first and second major surfaces. Representative examples of suitable types of film include films of poly(ethylene); poly(vinyl chloride); poly(vinylidene fluoride); copolymers of ethylene and propylene; poly(ethyl acrylate); and the like.

For some applications, e.g., when a thermomorphic pressure sensitive adhesive is applied to a carrier (which can be a temporary carrier, if desired) and then subjected to, e.g., heat treatment to induce a secondary structure (as described infra), suitable carriers should generally have adequate thermal stability so not to be degraded or deformed by the heat embossing process used. Such carriers include, but are not limited to, those made from materials selected from the group consisting of poly(propylene), poly(ethylene), poly(vinyl chloride), polyester (e.g., poly(ethylene terephthalate)), polyamide films such as that available from duPont Co., Wilmington, Del., under the trade designation "KAPTON," cellulose acetate, and ethyl cellulose. If a temporary carrier is used in processing the thermomorphic adhesive, the thermomorphic adhesive can then be transfer laminated to a temperature-responsive carrier.

An especially preferred temperature-responsive carrier film is a film which (in either its initial or final state) has at least one surface with a recessed surface portion (having one or more recesses) and a raised surface portion (having one or more projections) therein. The raised surface portion in the carrier film can be substantially continuous, thereby forming one continuous projection. This results in the recessed surface portion being discontinuous. When the recessed surface portion is discontinuous, separate recesses are formed that are spaced apart from one another. Alternatively, the raised surface portion can be discontinuous. If the raised surface portion is discontinuous, the surface of the carrier film contains a plurality of spaced apart projections, i.e., protrusions, preferably substantially uniformly distributed. In this case, the recessed surface portion is substantially continuous. Thus, this carrier film comprises a surface with one recess that is substantially continuous and interrupted by projections penetrating therefrom.

For some applications, e.g., double coated tape constructions for use in joining two substrates, preferred carriers are substantially laterally stable (i.e., the length and width of the carrier remain substantially the same upon, e.g., application of heat), yet temperature-responsive or temperature-recoverable. That is, the carrier, and therefore the article which it forms, recovers toward an original shape from which it had, e.g., previously been deformed upon the application of thermal energy. (The term "recoverable," as used herein, also includes an article that adopts a new configuration even if it has not been previously deformed.) Typically, the overall length and width of such a preferred article does not significantly change, while the surface recovers toward a substantially smooth (essentially unstructured) configuration. Thus, although the carrier is substantially laterally stable, changes in the thickness of portions of the carrier (i.e., protrusions or recesses) can occur. That is, the raised surface portion (or alternatively the recessed surface portion) can collapse or retract to allow an adhesive coating to contact a substrate upon, e.g., heating the carrier. Alternatively, an initially unstructured carrier can develop structure (e.g., a raised surface portion) upon, e.g., the application of heat, resulting in the de-bonding or release of an adhesive coating from a substrate surface.

For other types of applications, carriers which are not substantially laterally stable, e.g., heat shrink films, can be useful or even preferred. Such a lack of lateral stability can provide additional driving force to aid, e.g., in the removal of the article of the invention from a substrate surface.

One method of making a carrier film recoverable upon, e.g., exposure to thermal energy is to build a memory into the film. The memory effect of a carrier film can be observed when a portion of a heat stable film which has been temporarily locked into a heat unstable condition is exposed to sufficient thermal energy to allow the film to return to its heat stable condition. The heat stable condition of the film can be created by, for example, electron beam irradiation of the film to crosslink polymer chains in the film and thereby create a more thermally stable form of the film. The crosslinks also provide a restoring force so that any portion of the film that is displaced from its heat stable condition to a heat unstable condition will tend to return to its heat stable condition if the film is exposed to sufficient thermal energy. Temperature-responsive carrier films having a memory effect can thus be prepared by crosslinking a film, embossing the film to displace at least a portion of the film from its heat stable condition, and cooling the film while it is maintained in an embossed condition to temporarily lock the film into a heat unstable condition. When the embossed film is subsequently exposed to sufficient thermal energy to allow the polymer to "flow," the restoring force imparted by the crosslinking causes the film to return to its heat stable condition (i.e., the memory effect). Suitable polymeric materials that can be memory shaped include, but are not limited to: polyolefins, such as high density poly(ethylene), low density poly(ethylene), and copolymers such as ethylene/ethyl acrylate copolymer and ethylene/acrylic acid copolymer; fluoropolymers such as poly(vinylidene fluoride) and ethylene/tetrafluoroethylene copolymer; nylon; and poly(vinyl chloride). The polymeric material is normally extruded or otherwise melt-shaped. The thickness of the material is dependent on the size of the substrate and the strength required by the article in its recovered state.

Another method of making a carrier film recoverable upon, e.g., exposure to thermal energy is to incorporate projections into the carrier film by adhering "stand-offs" to the film. These stand-offs can typically be made of a temperature-responsive material that is different from the material of the carrier film. Upon application of thermal energy, the stand-offs are modified such that they allow an adhesive coating on the carrier film to contact the substrate. As used herein, a carrier film with such temperature-responsive stand-offs is temperature-responsive or temperature-recoverable even though the carrier film has not been deformed as by embossing. Examples of suitable materials for the stand-offs include, but are not limited to: low melting thermoplastic polymers, such as polystyrene, polyolefins, polyesters, polyacrylates, polymethacrylates, and copolymers of acrylates and methacrylates; and hot melt adhesives having a melting point above about 120° F. (49° C.), preferably above about 240° F. (116° C.), but not greater than the melting point of the carrier film. In such embodiments, the carrier film is not limited to a polymeric material. Rather, it can be any thick or thin plastic (synthetic or natural), reflective sheeting, fabric (woven or nonwoven), paper, metal foil, composite material, etc.

Embodiments comprising stand-offs can exhibit one or more carrier transition temperatures, depending upon whether the stand-offs alone or both the stand-offs and the carrier film change shape as heat is applied. Useful constructions can be obtained by having thermomorphic adhesive on either the side (i.e., the major surface) of the film which bears the stand-offs, or on the opposite side of the film, or both.

Adhesives

Pressure-sensitive adhesives (PSAs) suitable for use in making the article of the invention are those which are thermomorphic or capable of changing their shape (e.g., their surface topography) at one or more transition temperatures. Suitable thermomorphic PSAs have a primary shape imparted thereto, which can be converted to a secondary shape that is maintained until a sufficient temperature change occurs (e.g., until heat is applied above a certain threshold temperature), and are capable of transitioning from the secondary shape back to the primary shape, e.g., upon the application of heat.

The shapes of the thermomorphic PSA materials can vary. The shape can be in the overall form of the material, such as a spherical particle (i.e., microsphere), or in the surface features (i.e., topography) of the material. Examples of surface feature shapes include, but are not limited to, hemispheres, prisms such as square prisms, rectangular prisms, and other similar polygonal features, pyramids such as cube corners and tetrahedra, ellipses, and grooves. Positive or negative features can be used, such as convex or concave hemispheres. Truncated features can also be used. These surface features can be in ordered or random and irregular arrays.

Especially preferred thermomorphic PSAs include a continuous crystalline polymer component and a discrete crosslinked elastomeric polymer component, which may or may not be continuous. As used herein, "discrete" polymer components mean that the crystalline polymer component is discernible from the elastomeric polymer component by a variety of techniques, such as optical microscopy. That is, the PSA has a continuous phase of a crystalline component that is separate and distinct from an elastomeric component. As used herein, a "continuous" polymer component is one that is substantially uninterrupted throughout the sample such that the thermomorphic behavior of the PSA is maintained. The crystalline polymer component imparts at least one distinct crystalline melting point to the pressure sensitive adhesive.

The elastomeric polymer component includes a crosslinked pressure sensitive adhesive. It imparts the pressure sensitive adhesive properties and the elastic recovery force necessary to attain the primary shape of the thermomorphic PSA. The pressure sensitive adhesive compositions that can be used in the elastomeric component are those that are typically suitable for use in adhesive tapes. Such materials possess a four-fold balance of adhesion, cohesion, stretchiness, and elasticity, and a glass transition temperature (Tg) of less than about 20° C. Thus, the pressure sensitive adhesive compositions forming the elastomeric component are tacky to the touch at room temperature (e.g., about 20°–25° C.), as can be readily determined by a finger tack test or by conventional measurement devices, and can easily form a useful adhesive bond with the application of light pressure.

The crystalline polymer component includes a crystalline material that typically is soluble in organic solvents or in the monomers that form the elastomeric component. It imparts the lock-in mechanism necessary to stabilize the secondary shape. This can be better understood by referring to the process by which the thermomorphic PSAs can be made and function. Initially, the PSA is synthesized with a given shape (e.g., surface topography). The crosslinked elastomeric polymer component supports this primary shape. At a temperature above the melting temperature ($T_m$) of the crystalline polymer component, a secondary shape is given to the PSA. While forcing the PSA to have this shape (by pressure, for example), the PSA is cooled to a temperature below the $T_m$ of the crystalline polymer component, thereby reforming the crystalline structure and locking in the secondary shape.

This secondary shape will be maintained as long as the temperature is kept below the $T_m$ of the crystalline polymer component. When the PSA is, e.g., heated above the $T_m$, the crystalline structure melts and the elastic recovery forces of the elastomeric polymer component cause the PSA to revert to its primary shape.

The rate of recovery and the fidelity of the recovered primary shape are directly related to the crosslinking density of the elastomeric polymer component. The crosslinking density determines the "memory" of the PSA, or the speed of recovery of the primary shape and fidelity of the primary shape, whereas the crystalline component and its morphology determine the degree to which the secondary shape is maintained. Generally, the higher the degree of crosslinking, the faster the rate of recovery of the primary shape and the higher the fidelity (i.e., the degree to which the heated thermomorphic adhesive faithfully replicates the primary shape as originally imparted) of the recovered shape. The degree of crosslinking of the elastomeric component is generally sufficient to provide recovery of the primary shape, yet must also allow the component to retain the four-fold balance of PSA properties.

An optimum balance thus exists between the amount of elastic recovery force stored in the deformed elastomeric polymer component and the amount of crystallinity needed to retain the secondary shape of the PSA. The crystalline component is typically present in a sufficient amount to provide a thermomorphic adhesive possessing a morphology in which the crystalline component is continuous and supports the secondary shape until transition to the primary shape is desired. Therefore, the crosslinking density of the elastomeric polymer component and the degree of crystallinity determine the overall thermomorphic response of the PSA.

The preferred thermomorphic pressure sensitive adhesives can have one of two general morphologies depending on the amount and structure of the crystalline polymer component present in these materials. The morphology of these compositions can be observed by optical or electron microscopy. When optical microscopy is used, the crystalline polymer component is easily identified by the appearance of birefringence when viewed between crosspolarizers. Both morphologies are characterized by the presence of a continuous crystalline polymer component and a distinct elastomeric polymer component that is readily discernible from the crystalline polymer component.

For example, for side-chain crystalline polyacrylates, such as poly(octadecyl acrylate), in each of these morphologies there is typically at least about 3 percent by weight (wt %) of the crystalline polymer component, based on the total weight of the crystalline and elastomeric components of the thermormorphic PSA. One of the morphologies includes both a continuous crystalline polymer component and a continuous elastomeric polymer component. This is referred to herein as a "co-continuous" (CC) morphology. In this morphology, the crystalline polymer component may contain within it dispersed domains of the elastomeric polymer component, and the elastomeric polymer component may contain within it dispersed domains of the crystalline polymer component, as long as the majority of the crystalline polymer component and elastomeric polymer component are continuous. Similarly, for these acrylates, the CC morphology includes less than about 5 wt % crystalline polymer component. The other morphology includes a continuous crystalline polymer component and a discontinuous elastomeric polymer component. That is, the elastomeric polymer component is dispersed within the continuous crystalline polymer component. This is referred to herein as an "elastomeric dispersed" (ED) morphology. Typically, in side-chain crystalline polyacrylates, such as poly(octadecyl acrylate), the ED morphology includes more than about 5 wt % crystalline polymer component. For thermomorphic PSA compositions that have about 5 wt % crystalline polymer component, the morphology can be either ED or CC depending on the crosslink density and the crystallinity.

The amount of crystalline component required to induce the transition between these two morphologies can be influenced by factors such as polar monomer content of the elastomeric polymer component, the temperature at which the elastomeric component polymerizes, and the rate at which this polymerization occurs. Lower concentrations of crystalline component can be used to obtain an "ED" morphology if the elastomeric component formulation contains polar monomers. For main chain crystallizable polymer components, such as polyesters, polytetrahydrofuran, lower polyolefins (e.g., $C_2$–$C_3$ olefins), and polyurethanes containing crystalline polyester segments, about 10–30 wt % is useful in obtaining these desired morphologies.

Typically, as the crystalline content and crosslinking density increases, peel adhesion and tack generally decrease. Higher levels of crosslinking and crystalline component tend to reinforce the adhesive.

The elastomeric polymer component of preferred thermomorphic PSAs includes at least one crosslinked polymeric material having pressure sensitive adhesive properties. As used herein, "elastomeric" materials can be described, for example, as amorphous or noncrystalline materials that can be stretched to at least twice their original length and that will retract rapidly and forcibly to substantially (generally at least about 75% of, preferably, at least about 90% of) their original dimensions upon release of the force.

Thus, suitable elastomeric materials for use in the elastomeric polymer component are those that can be crosslinked and exhibit pressure sensitive adhesive properties either inherently or by compounding with commonly known tackifying resins. Typically, such crosslinkable pressure sensitive adhesive compositions include tackified natural rubbers, tackified block copolymers (e.g., styrene-isoprene-stryrene, styrene-butadiene-styrene, and styrene-ethylene-butene-styrene block copolymers), tackified silicone elastomers, and inherently tacky materials such as poly(acrylates), poly(vinyl esters), and poly($\alpha$-olefins).

Poly(acrylates) are a preferred elastomeric material for use in the elastomeric polymer component of the preferred thermomorphic PSAs. These poly(acrylates) are derived from alkyl acrylate and methacrylate monomers, which are specifically monofunctional unsaturated acrylate and methacrylate esters of nontertiary alkyl alcohols, the alkyl groups of which preferably have about 4–11 carbon atoms. Such acrylate monomers, when homopolymerized, generally have glass transition temperatures below about –10° C. Examples of such monomers include, but are not limited to, those selected from the group consisting of isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, and mixtures thereof. Preferred poly(acrylates) can be prepared from acrylate monomers including those selected from the group consisting of isooctyl acrylate, isononyl acrylate, isoamyl acrylate, isodecyl acrylate, 2-ethylhexyl acrylate, n-butyl acrylate, sec-butyl acrylate, and mixtures thereof.

Acrylate or methacrylate or other vinyl monomers which, as homopolymers, have glass transition temperatures higher than about −10° C. may optionally be utilized in conjunction with one or more of the acrylate or methacrylate monomers provided that the glass transition temperature of the resultant polymer is below about −10° C. and that it has no melting point. Examples of vinyl monomers which, as homopolymers, have glass transition temperatures higher than about −10° C. include, but are not limited to, tert-butyl acrylate, isobornyl acrylate, lauryl acrylate, octadecyl acrylate, butyl methacrylate, vinyl acetate, acrylonitrile, and the like. These monomers can be used in various combinations.

Similarly, free radically copolymerizable polar monomers can also be employed, again provided that the glass transition temperature of the resultant polymer is below about −10° C. Examples of useful polar monomers include, but are not limited to, acrylic acid, methacrylic acid, itaconic acid, crotonic acid, maleic acid, fumaric acid, sulfoethyl methacrylate, and ionic monomers such as sodium methacrylate, ammonium acrylate, sodium acrylate, trimethylamine p-vinyl benzimide, 4,4,9-trimethyl-4-azonia-7-oxo-8-oxa-dec-9-ene-1-sulphonate, N,N-dimethyl-N-(beta-methacryloxy-ethyl)ammonium propionate betaine, trimethylamine methacrylimide, 1,1-dimethyl-1-(2,3-dihydroxypropyl)amine methacrylimide, N-vinyl pyrrolidone, N-vinyl caprolactam, acrylamide, t-butyl acrylamide, dimethyl amino ethyl acrylamide, N-octyl acrylamide, and the like. These monomers can be used in various combinations. Preferred polar monomers are those selected from the group consisting of monoolefinic monocarboxylic acids, monoolefinic dicarboxylic acids, acrylamides, N-substituted acrylamides, salts thereof, and mixtures thereof. Particularly preferred polar monomers are those selected from the group consisting of acrylic acid, methacrylic acid, N-vinyl pyrrolidone, and mixtures thereof.

Vinyl ester monomers suitable for use include, but are not limited to, those selected from the group consisting of vinyl 2-ethyl hexanoate, vinyl caprate, vinyl laurate, vinyl pelargonate, vinyl hexanoate, vinyl propionate, vinyl decanoate, vinyl octanoate, and other monofunctional unsaturated vinyl esters of linear or branched carboxylic acids having about 1–14 carbon atoms which, as homopolymers, have glass transition temperatures below about −10° C. Preferred vinyl ester monomers are those selected from the group consisting of vinyl laurate, vinyl caprate, vinyl 2-ethylhexanoate, and mixtures thereof.

A variety of methods are available to crosslink the elastomeric materials of the elastomeric polymer component. Crosslinking can be imparted during the elastomeric component polymerization through the use of copolymerizable multifunctional crosslinking agents that are capable of copolymerizing with the elastomeric monomer mixture. The elastomeric component can also be crosslinked following polymerization using other multifunctional crosslinking agents, such as metal ions and peroxides, which are reactive with moieties present on the already-formed polymer chains, or through the use of ionizing radiation, such as electron beams. Whatever crosslinking means are used, crosslinking is done when the primary shape is present.

Preferably, multifunctional crosslinking agents are used, particularly for the preferred acrylate (co)polymers and vinyl ester (co)polymers. The term "multifunctional" as used herein refers to crosslinking agents that possess two or more free radically polymerizable ethylenically unsaturated groups. Suitable multifunctional crosslinking agents include, but are not limited to, polymeric multifunctional (meth)acrylates, e.g., poly(ethylene oxide)diacrylate or poly(ethylene)oxide dimethacrylate; polyvinylic crosslinking agents, such as substituted and unsubstituted divinylbenzene; and difunctional urethane acrylates. These multifunctional crosslinking agents can be used in a variety of combinations. Preferred multifunctional crosslinking agents are those selected from the group consisting of acrylic or methacrylic esters of diols such as butanediol and hexanediol, triols such as glycerol, tetrols such as pentaerythritol, and mixtures thereof.

When such multifunctional crosslinking agents are used, one or more are used in an amount up to about 0.3 equivalent weight percent, preferably up to about 0.2 equivalent weight percent, more preferably up to about 0.15 equivalent weight percent, and most preferably up to about 0.1 equivalent weight percent, of the total polymerizable composition. Typically, no less than about 0.02 equivalent weight percent, of a multifunctional crosslinker should be present to provide sufficient crosslink density to support the primary shape. The "equivalent weight percent" of a given compound is defined as one hundred times the number of equivalents of that compound divided by the total number of equivalents in the total composition, wherein an equivalent is the number of grams divided by the equivalent weight. The equivalent weight is defined as the molecular weight divided by the number of polymerizable groups in the monomer (in the case of those monomers with only one polymerizable group, equivalent weight is the molecular weight).

Initiators can also be used to enhance the rate of polymerization and/or crosslinking. Suitable free radical initiators include thermally activated initiators such as azo compounds, hydroperoxides, peroxides and the like, and photoinitiators. Photoinitiators can be organic, organometallic, or inorganic compounds, but are most commonly organic in nature. Examples of commonly used organic photoinitiators include benzoin and its derivatives, benzil ketals, acetophenone, acetophenone derivatives, benzophenone, and benzophenone derivatives. The initiator is generally used in an amount ranging from about 0.01 percent up to about 10 percent by weight of the total polymerizable mixture, preferably up to about 5 percent.

The crystalline polymer component of preferred thermomorphic PSAs includes at least one polymeric material that crystallizes, preferably above room temperature (i.e., 20°–25° C.). Such crystallinity, provided by the aggregation of crystallizable moieties present in the backbone (i.e., main chain) or pendant substituents (i.e., side chains) of these components, can be determined by well known crystallographic, calorimetric, or dynamic/mechanical methods. For the purposes of the present invention, this component imparts to the PSA at least one melting or softening temperature ($T_m$) as measured experimentally (for example, by differential scanning calorimetry (DSC)) of greater than about 20° C. Preferably, this component imparts a $T_m$ to the thermomorphic PSA of about 30°–100° C. If more than one crystalline material is used in the crystalline polymer component, more than one distinct melting or softening point will be seen. To facilitate preparation, the crystalline materials are typically soluble in organic solvents or in the monomers that form the elastomeric component.

Examples of suitable crystalline polymeric materials having crystallizable main chain or backbone segments include, but are not limited to, polyesters, polytetrahydrofuran, lower polyolefins (e.g., $C_2$–$C_3$ olefins), and polyurethanes containing crystalline polyester segments.

Examples of suitable crystalline polymeric materials having crystallizable pendant moieties (i.e., side chains) include, but are not limited to, poly(acrylate), poly(methacrylate), poly(acrylamide), poly(methacrylamide), poly(vinyl ester) and poly(α-olefin) polymers and copolymers having the following formula: {—CH$_2$—CH—[X—(CH$_2$)$_n$—CH$_3$]—}$_m$, wherein X is —CH$_2$—, —C(O)O—, —O—C(O)—, and —C(O)—NH—, etc., and n is great enough to provide sufficient side chain length and conformation to form polymers containing crystalline domains or regions at room temperature. A description of the preparation and morphology/conformational properties that determine the crystalline character of such side chain crystallizable or "comb-like" polymers is presented by Platé and Shibaev in "Comb-Like Polymers. Structure and Properties," *Journal of Polymer Science—Macromolecular Reviews,* 8, 117–253 (1974), the description of which is incorporated herein by reference.

Preferred crystalline polymeric materials are acrylate or methacrylate polymers derived from acrylate or methacrylate esters of nontertiary higher alkyl alcohols. The alkyl groups of these alcohols contain at least about 12, preferably about 16–26, carbon atoms. Thus, preferred crystalline polymeric materials include poly(dodecyl acrylate), poly(isotridecyl acrylate), poly(n-tetradecyl acrylate), poly(n-hexadecyl acrylate), poly(n-hexadecyl methacrylate), poly(n-octadecyl acrylate), poly(behenyl acrylate), poly(eicosanyl acrylate), and mixtures thereof. Of these, poly(n-octadecyl acrylate), poly(behenyl acrylate), and mixtures or copolymers thereof are preferred. As determined by DSC, poly(octadecyl acrylate) has a melting point in the range of about 42° C. to about 49° C. with an enthalpy of fusion of about 77 Joules/gram, and poly(behenyl acrylate) has a melting point in the range of about 62° C. to about 72° C. and an enthalpy of fusion of about 105 Joules/gram. These crystalline polymers are particularly preferred due to their solubility in organic solvents near and above their respective melting temperatures. This facilitates formation of a continuous crystalline component distinct from the elastomeric polymer component.

As long as a copolymer has a melting point, it can include noncrystallizable monomers. Acrylate or methacrylate or other vinyl monomers that are free-radically reactive may optionally be utilized in conjunction with one or more of the side chain crystallizable acrylate and methacrylate monomers provided that the resultant polymer has a melting or softening temperature above room temperature. Examples of such free-radically reactive monomers include, but are not limited to, tert-butyl acrylate, isobornyl acrylate, butyl methacrylate, vinyl acetate, acrylonitrile, styrene, isooctyl acrylate, n-butyl acrylate, 2-ethylhexyl acrylate, and the like. Various combinations of these monomers can be used.

The crystalline polymer component, whether side-chain or backbone crystallizable, may or may not be crosslinked. Preferably, the crystalline polymer component is not crosslinked, at least because preparation is easier.

If it is desirable to crosslink the crystalline polymer component, a variety of approaches, as described above for the elastomeric polymer component, are available. For example, ionizing radiation, peroxides, silanes, metal ions, or multifunctional crosslinking agents can be used to chemically crosslink the crystalline materials. Preferably, multifunctional crosslinking agents are used, particularly for the preferred acrylate (co)polymers. Suitable multifunctional crosslinking agents include, but are not limited to, polymeric multifunctional (meth)acrylates, e.g., poly(ethylene oxide) diacrylate or poly(ethylene) oxide dimethacrylate; polyvinylic crosslinking agents, such as substituted and unsubstituted divinylbenzene; and difunctional urethane acrylates. These multifunctional crosslinking agents can be used in a variety of combinations. Preferred multifunctional crosslinking agents are those selected from the group consisting of acrylic or methacrylic esters of diols such as butanediol diacrylate, triols such as glycerol, tetrols such as pentaerythritol, and mixtures thereof.

Also preferred are side chain crystalline polymeric materials derived from higher alpha-olefin monomers, such as poly(1-decene), poly(1-dodecene), poly(1-tetradecene) and poly(1-hexadecene), and higher vinyl esters, such as vinyl tetradecanoate, vinyl hexadecanoate and vinyl octadecanoate.

Preferred thermomorphic pressure sensitive adhesives can be synthesized by a variety of sequential methods to form either films or particles. That is, a sequence that involves, for example, forming the crystalline polymer component and then the elastomeric polymer component in the presence of the crystalline polymer component can be used. As a specific example, a free-radical polymerization process (e.g., solution, suspension, emulsion, or bulk polymerization) can be used to form the crystalline component from acrylate or methacrylate monomers. An example of a useful solution polymerization method involving such monomers is described in U.S. Pat. No. 4,554,324 (Husman et al.). In this reference, the acrylate or methacrylate monomers are dissolved in a suitable inert organic solvent and polymerized by standard free radical polymerization utilizing a suitable free radical initiator. Suitable free radical initiators that can be used include azo compounds such as 2,2'-azobis (isobutyronitrile), hydroperoxides such as tert-butyl hydroperoxide, peroxides such as benzoyl peroxide or cyclohexanone peroxide. Generally, for preparation of the crystalline component in a free radical polymerization process, about 0.01–5 wt % of such thermally activated initiators are used, based upon the total polymerizable composition.

Subsequently, the already-formed crystalline polymer component can be dissolved in the monomers, initiator, and crosslinking agent used to prepare the elastomeric component at a temperature such that the crystalline component dissolves. For a film, this solution can then be coated onto a backing or siliconized release liner, for example, and subjected to conditions (e.g., thermal or ultraviolet radiation) that polymerize and crosslink the monomers of the elastomeric component. It is during this crosslinking stage that the primary shape is present. The crystalline component can also be crosslinked at this stage of the sequential process, if desired.

If a siliconized release liner is used, it can be structured (e.g., microstructured), such as those described in U.S. Pat. No. 5,296,277 (Wilson et al.) and International Patent Publication No. WO 95/11945 (Minnesota Mining & Manufacturing Company), the descriptions of which are incorporated herein by reference, if a nonplanar primary topography is desired.

For particulate PSAs (e.g., microspheres or microparticles), the suspension free radical polymerization methods, such as those described in U.S. Pat. No. 3,691,140 (Silver); U.S. Pat. No. 4,166,152 (Baker et al.); U.S. Pat. No. 4,786,696 (Bohnel); U.S. Pat. No. 5,045,569 (Delgado); and U.S. Pat. No. 5,508,313 (Delgado) and International Patent Publication Nos. 93/12147 and 96/01281 (Minnesota Mining & Manufacturing Company), the descriptions of which are incorporated by reference, can be used with modification. For particulates, suspension polymerizations are typically performed in the presence of a variety of emulsifiers, surfactants, stabilizers and/or under particular process conditions which induce the formation of, and prevent the agglomeration of, the particles (e.g., microspheres having a diameter of about 1–10 micrometers). An example of an adaptation of these processes includes dissolving (or dispersing) the already-formed (crosslinked) crystalline material in the elastomeric component monomer/crosslinker/initiator mixture at a temperature such that the crystalline polymer component dissolves, followed by formation of an emulsion and subsequent thermal polymerization of the monomer droplets.

Suitable thermomorphic pressure sensitive adhesive compositions can include conventional additives such as tackifiers (wood rosin, polyesters, etc.), plasticizers, neutralizing agents, stabilizers, antioxidants, fillers, conductive particles, colorants, and the like. These ingredients can be incorporated in amounts that do not materially adversely affect the desired properties of the thermomorphic pressure sensitive adhesives.

Preparation, Description, and Use of Temperature-Responsive Adhesive Articles

In embodiments employing memory-shaped film that exhibit shape change through movement perpendicular to the plane of the film, at least part of the carrier film has an embossed pattern, which is lessened and often "disappears" when, e.g., adequate heat is applied. The embossed pattern may be applied by a number of methods, for example by stamping or using a hot press. Such materials exhibit the property of elastic or plastic memory.

One method of producing a temperature-responsive carrier includes shaping the polymeric material into the desired heat stable form, subsequently crosslinking the polymeric material, heating the article to a temperature sufficient to permit deformation of the article yet retain restorative forces imparted by crosslinking or crystallinity, and cooling the article while in the deformed state so that the deformed state of the article is retained. In use, because the deformed state of the article is heat-unstable, heat can be applied that is sufficient to cause the article to approach its original, heat stable shape, i.e., to invoke the memory effect. Such energy sources include, but are not limited to infrared radiation sources, hair dryers, heated rolls, etc. Thus, the embossed pattern will generally "disappear" and the carrier film will become essentially unstructured.

An alternative method of producing a temperature-responsive carrier is to first emboss and crosslink (e.g., through electron beam irradiation) a suitable material, followed by application of, e.g., heat and pressure to flatten the material (render it essentially unstructured), followed by cooling (while continuing to apply pressure) such that the essentially unstructured topography is retained. In use, upon, e.g., application of heat, such a carrier will transition from the essentially unstructured topography to the original structured topography which resulted from the initial embossing.

Embossed patterns can be composed of a regular arrangement or array, an abstract design, or a random pattern. Depending on the application, the embossed pattern may cover only part of the first surface of the carrier or it may cover substantially the entire first surface. Isolated and random cosmetic flaws, occurring as a result of the preparation of the article, are not considered an embossed pattern for purposes of this specification.

The size, shape, and depth (or height) of the recesses (and projections) in the embossed carrier are not normally critical, but should be selected to match the intended application. The three dimensional shape of the recesses and projections can easily be controlled if desired and tailored to specific applications. Cross-sections of the three dimensional shapes, taken parallel to the surfaces of the carrier, can be of a wide variety of shapes, including oval, circular, polygonal, or rectangular.

Conventional coating techniques utilized in the manufacture of adhesive tape constructions can be used to apply the thermomorphic adhesives to at least a portion of at least one surface of the carriers of the present invention. These techniques include, but are not limited to, knife coating, roll coating, reverse roll coating, and gravure coating techniques, as well as extrusion, coextrusion, hot melt techniques, curtain coating, spray coating, painting, dipping, and the like, which employ conventional coating devices. The resulting coating can then be passed through a heat cycle (below the transition temperature of the carrier) to remove solvent or water to produce the adhesive construction. Alternatively, a solventless, curable adhesive (often referred to as 100% solids adhesive) can be applied to a carrier using knife coating or metered coating techniques similar to those described above and subsequently cured to an adhesive state by exposure to ultraviolet radiation or heat (below the transition temperature of the carrier). As one skilled in the art will recognize, the coating technique should be selected such that it does not cause premature response of the carrier.

If desired, the carrier and the thermomorphic pressure sensitive adhesive can be separately processed to impart a memory effect to each individually, and the two can thereafter be joined by, e.g., lamination at a temperature which is below the transition temperatures for each.

Thermomorphic pressure sensitive adhesives can be processed by a variety of methods to impart a primary and/or a secondary shape (e.g., surface topography) to the adhesive. For example, preferred means for preparing pressure sensitive adhesive films of varying surface topographies can be found in International Patent Publication No. WO 95/11945 (Minnesota Mining and Manufacturing Company), the descriptions of which are incorporated herein by reference. For example, to prepare a thermomorphic PSA film having a planar primary shape (i.e., surface topography), a thermomorphic adhesive or polymerizable composition can be coated onto a backing or liner prior to polymerization and/or crosslinking of the elastomeric component. The adhesive layer is then crosslinked and the exposed surface of the adhesive layer is heat embossed using a tool having the desired secondary topography at an embossing temperature above the $T_m$ of the crystalline component. At this elevated temperature, the embossed adhesive layer surface adapts from its essentially unstructured or essentially planar primary topography to a secondary topography as dictated by the surface topography of the embossing tool. The temperature of the adhesive film is then brought below the $T_m$ of the crystalline component while the secondary topography is present.

Alternatively, in another preferred method for obtaining a thermomorphic PSA film having a structured primary topography, the thermomorphic adhesive or polymerizable composition can be coated onto a release liner or releasable mold that possesses a particular primary topography. This adhesive coating or polymerizable composition is polymerized and/or crosslinked at that time to preserve the primary topography and removed from the liner or tool. The structured adhesive surface is then heat embossed at an embossing temperature above the $T_m$ of the crystalline component as described above with a tool bearing a secondary topography. The thermomorphic adhesive film is then cooled to below the $T_m$ of the crystalline component while the secondary topography is present.

Particulate thermomorphic pressure sensitive adhesive articles can be prepared by coating aqueous suspensions or solvent dispersions of the pressure sensitive adhesive microspheres or microparticles onto suitable backings by conventional coating techniques, such as knife coating or Meyer bar coating or use of an extrusion die. The primary shape of these particulate adhesives can then be transformed by heat compressing the coated particles at a processing temperature above the $T_m$ of the crystalline component. The resultant secondary shape of the compressed microspheres or microparticles is dependent upon the structure of the surface of the press which contacts the particulate thermomorphic materials. Presses having planar surfaces lead to particles having a flattened appearance, the regularity and symmetry of such appearance dependent on the primary shape of the particle. For example, spherical particles when processed in this manner would be transformed into adhesive materials having a disc-like secondary shape. Should the press have either a regular or random topography of the same scale as the particles (i.e., grooves, ridges, hemispheres or other geometric or irregular projections or depressions of a micron or submicron magnitude), then the portion or entirety of these thermomorphic particles which contact these shapes, projections, depressions, etc., will conform to these shapes or patterns under the proper compressive and thermal forces.

The temperature-responsive adhesive articles of the invention generally comprise a layer of thermomorphic PSA on a carrier. Some embodiments of the articles can be adhered to a substrate by, e.g., the application of thermal energy alone (e.g., certain embodiments can be applied to a substrate manually and then, without any physical contact, heat can be applied to modify the carrier (and/or the adhesive) such that adhesive comes into contact (or more intimate contact) with the substrate), whereas others may require the application of physical pressure. The articles can be used for joining, masking, mending, protecting, mounting, labeling, and other commonly known applications. Due to their novel temperature-responsive behavior, however, the articles are particularly useful in applications which advantageously exploit the differential topographical capabilities present in both the adhesive and the carrier.

That is, the articles are particularly useful in applications that require differentiable adhesive properties "on demand" during the life cycle of the article. Examples of such applications include graphics, medical, and label constructions. For example, one of the inherent problems with traditional labels and adhesive-coated graphics is the difficulty in cleanly removing such articles from surfaces. In response to this problem, temperature-responsive labels or graphic articles can be prepared using the adhesives and carriers of the present invention that have an essentially unstructured or essentially planar secondary shape and a structured primary topography. Such articles would have a high bond strength and stable level of adhesion to a surface due to their continuous area of contact to that surface until they are, e.g., heated. Upon heating, the structured primary shape of both the adhesive and the carrier appears, reducing the contact area of the adhesive to the surface and allowing for easier removal of these articles.

Temperature-responsive adhesive articles used to deliver compositions to a surface can also be prepared. Examples of such articles have recessed secondary cavities and essentially planar primary topographies. Pigments, inks, pharmaceuticals or other compounds are placed in these cavities and the resultant article adhered to a surface. When heated, the secondary topography changes to the primary topography. As a result, the cavities disappear and bring the materials placed therein into direct contact with the surface to which the article is adhered.

Additionally, positionable PSA articles can be made having structured secondary topographies and essentially planar primary topographies. When the structured secondary topographies are properly configured, such positionable articles can be placed against a substrate surface and easily slid over the surface without pre-adhering to the substrate. Once positioned, the structured secondary topographies can be transformed to the essentially planar primary topographies, thereby forming a permanent, continuous bond by, e.g., heating the article.

Unlike the articles of the prior art, the articles of the invention can be designed so as to be both bondable on demand (easy to apply, by virtue of their positionable or repositionable characteristics) and removable on demand. This can be achieved by utilizing different initial surface topographies for the carrier and the adhesive and by having the topography change for the adhesive occur at a different transition temperature from that of the carrier. For example, the adhesive can be prepared so as to have an initial surface topography which is structured and which thereby imparts initial repositionability to the article. This adhesive can be paired with a carrier having an initial surface topography that is essentially unstructured and that has a transition temperature (at which the surface topography changes) which is higher than that of the adhesive. Upon, e.g., heating the article to a first transition temperature, the surface topography of the adhesive changes from the structured initial topography to an essentially unstructured topography, resulting in the bonding of the article to a substrate surface. Then, upon heating the article to a second (higher) transition temperature, the initial surface topography of the carrier changes from the essentially unstructured topography to a structured topography that causes the article to release from the substrate.

Figure 1A:
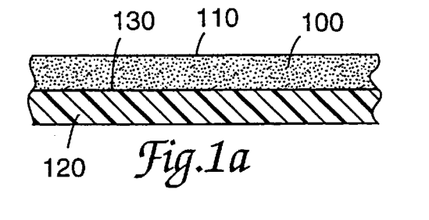
FIGS. 1a–1d show a sectional view of embodiments of the article of the invention, wherein both the carrier and the adhesive have an initial surface topography (FIG. 1a) which is essentially unstructured and which becomes structured upon, e.g., heating the article to certain transition temperatures (FIGS. 1b–1d).
Figure 1B:
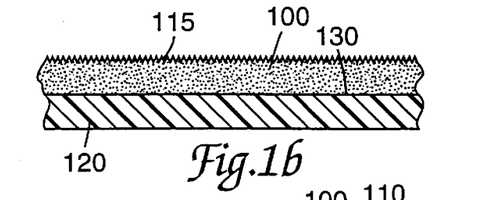
Figure 1C:
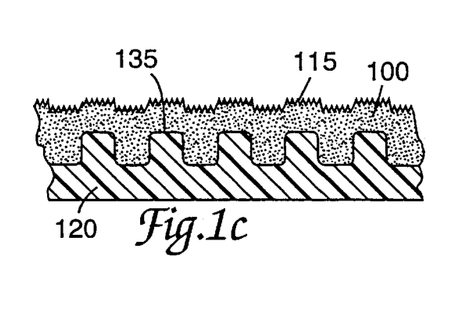

This and other embodiments of the article of the invention can be better understood by reference to the accompanying drawings, where FIGS. 1a, 1b, and 1c show an embodiment of the article of the invention, wherein an adhesive 100 having an essentially unstructured initial surface topography 110 has been applied to a carrier 120 having an essentially unstructured initial surface topography 130. Upon, e.g., heating the article to a transition temperature, the surface topography of the adhesive changes to a structured surface topography 115. Upon continued heating of the article to a higher transition temperature, the surface topography of the carrier changes to a structured surface topography 135. This embodiment can be used to provide initial adhesion to a substrate surface, followed by partial release from the surface as the adhesive assumes a structured surface topography, followed by more extensive release from the substrate surface as the carrier assumes a structured surface topography. The structured surface topographies of the adhesive and the carrier (in this and other embodiments of the invention) can independently be of a variety of shapes and dimensions.

Figure 1D:
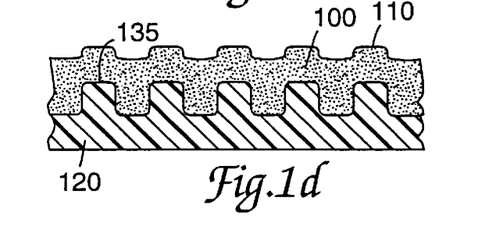

FIGS. 1a, 1d, and 1c show an embodiment similar to that of FIGS. 1a, 1b, and 1c, wherein the carrier responds (i.e., undergoes a change in surface topography) at a lower temperature than that at which the adhesive responds.

Figure 2A:
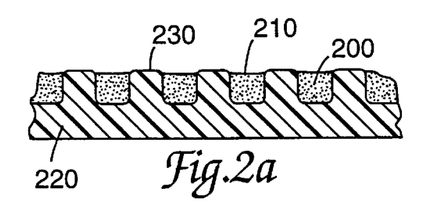
FIGS. 2a–2d show a sectional view of embodiments of the article of the invention, wherein the carrier has an initial surface topography (FIG. 2a) which is structured, the adhesive has an initial surface topography (FIG. 2a) which is essentially unstructured, and the surface topographies of each change upon, e.g., heating the article to certain transition temperatures (FIGS. 2b–2d).
Figure 2B:
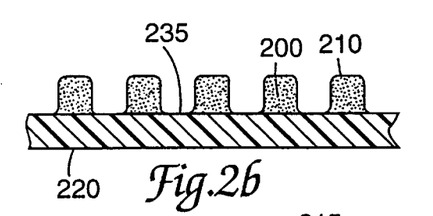
Figure 2C:
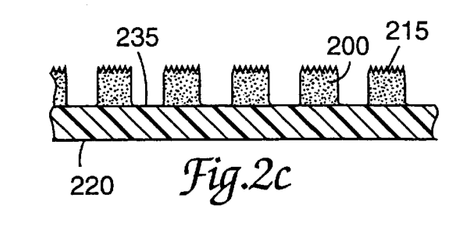

FIGS. 2a, 2b, and 2c show an embodiment of the article of the invention, wherein an adhesive 200 having an essentially unstructured initial surface topography 210 has been applied to a carrier 220 having a structured initial surface topography 230. Upon, e.g., heating the article to a transition temperature, the surface topography of the carrier changes to an essentially unstructured surface topography 235. Upon continued heating of the article to a higher transition temperature, the surface topography of the adhesive changes to a structured surface topography 215. This embodiment can be used to provide initial positionability on a substrate surface (provided that the thickness of the adhesive coating is less than the height of the structural projections of the carrier), followed by adhesion to the surface as the carrier assumes an essentially unstructured surface topography, followed by partial release from the substrate surface as the adhesive assumes a structured surface topography.

Figure 2D:
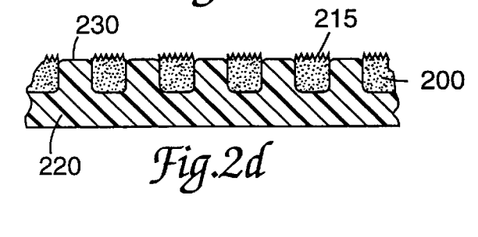

FIGS. 2a, 2d, and 2c show an embodiment similar to that of FIGS. 2a, 2b, and 2c, wherein the adhesive responds (i.e., undergoes a change in surface topography) at a lower temperature than that at which the carrier responds. This embodiment (FIG. 2d) provides repositionability until the carrier assumes an essentially unstructured surface topography (FIG. 2c) which allows for adhesion to the substrate surface.

Figure 3A:
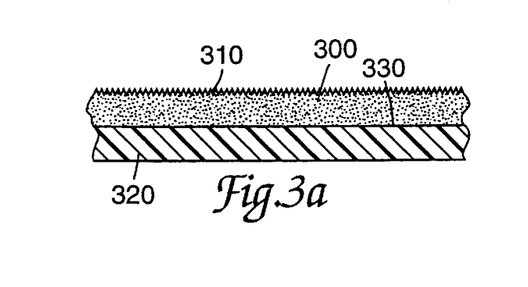
FIGS. 3a–3d show a sectional view of embodiments of the article of the invention, wherein the carrier has an initial surface topography (FIG. 3a) which is essentially unstructured, the adhesive has an initial surface topography (FIG. 3a) which is structured, and the surface topographies of each change upon, e.g., heating the article to certain transition temperatures (FIGS. 3b–3d).
Figure 3B:
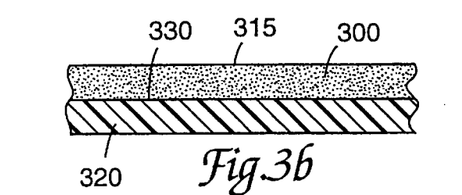
Figure 3C:
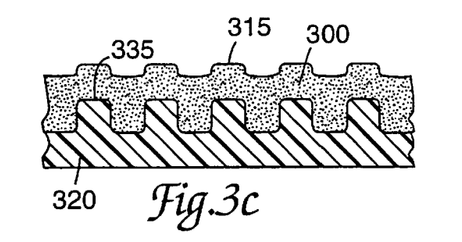

FIGS. 3a, 3b, and 3c show an embodiment of the article of the invention, wherein an adhesive 300 having a structured initial surface topography 310 has been applied to a carrier 320 having an essentially unstructured initial surface topography 330. Upon, e.g., heating the article to a transition temperature, the surface topography of the adhesive changes to an essentially unstructured surface topography 315. Upon continued heating of the article to a higher transition temperature, the surface topography of the carrier changes to a structured surface topography 335. This embodiment can be used to provide initial repositionable adhesion to a substrate surface, followed by increased adhesion to the surface as the adhesive assumes an essentially unstructured surface topography, followed by partial release from the substrate surface as the carrier assumes a structured surface topography.

Figure 3D:
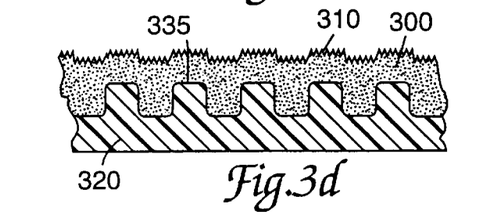

FIGS. 3a, 3d, and 3c show an embodiment similar to that of FIGS. 3a, 3b, and 3c, wherein the carrier responds (i.e., undergoes a change in surface topography) at a lower temperature than that at which the adhesive responds. This embodiment provides repositionability which increases when the carrier assumes a structured surface topography, followed by less repositionability and greater adhesion when the adhesive assumes an essentially unstructured surface topography which has an induced topography due to the structured topography of the carrier.

Figure 4A:
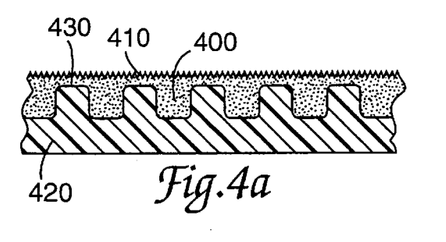
FIGS. 4a–4d show a sectional view of embodiments of the article of the invention, wherein both the carrier and the adhesive have an initial surface topography (FIG. 4a) which is structured and which becomes essentially unstructured upon, e.g., heating the article to certain transition temperatures (FIGS. 4b–4d).
Figure 4B:
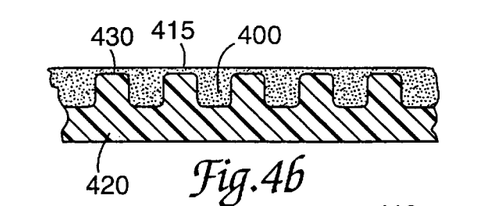
Figure 4C:
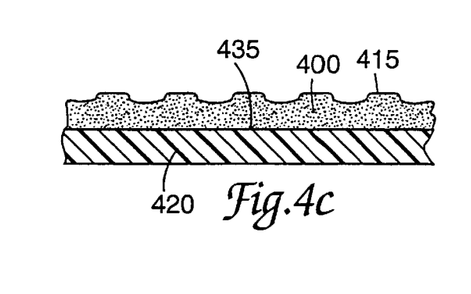

FIGS. 4a, 4b, and 4c show an embodiment of the article of the invention, wherein an adhesive 400 having a structured initial surface topography 410 has been applied to a carrier 420 having a structured initial surface topography 430. Upon, e.g., heating the article to a transition temperature, the surface topography of the adhesive changes to an essentially unstructured surface topography 415. Upon continued heating of the article to a higher transition temperature, the surface topography of the carrier changes to an essentially unstructured surface topography 435. This embodiment can be used to provide initial repositionable adhesion to a substrate surface, followed by bonding as the adhesive assumes an essentially unstructured surface topography. As the carrier then assumes an essentially unstructured surface topography, the level of bonding may decrease.

Figure 4D:
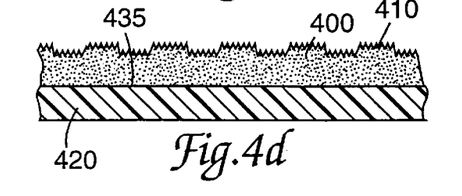

FIGS. 4a, 4d, and 4c show an embodiment similar to that of FIGS. 4a, 4b, and 4c, wherein the carrier responds (i.e., undergoes a change in surface topography) at a lower temperature than that at which the adhesive responds. This embodiment provides repositionability until the adhesive assumes an essentially unstructured surface topography which allows for increased adhesion to the substrate surface.

Figure 5A:
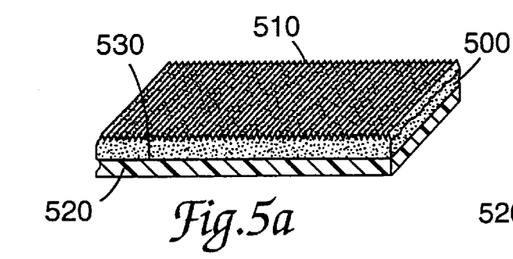
FIGS. 5a–5c show a perspective view of an embodiment of the article of the invention, wherein the carrier, unlike the carriers of the above-described embodiments, is not substantially laterally stable. The carrier has an initial surface topography (FIG. 5a) which is essentially unstructured, the adhesive has an initial surface topography (FIG. 5a) which is structured, and the surface topography of the adhesive changes upon, e.g., heating the article to a certain transition temperature (FIG. 5b). Heating to a second transition temperature causes lateral instability (e.g., shrinkage), which distorts both the adhesive and the carrier (FIG. 5c).
Figure 5B:
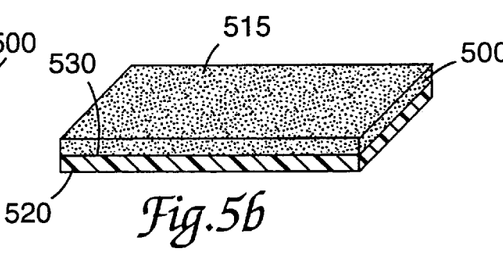
Figure 5C:
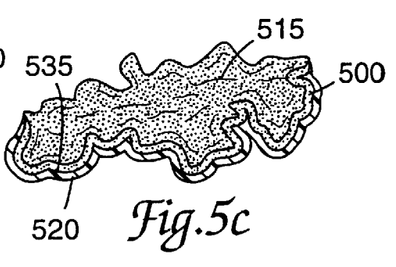

FIGS. 5a, 5b, and 5c show an embodiment of the article of the invention, wherein an adhesive 500 having a structured initial surface topography 510 has been applied to a carrier 520 which has an essentially unstructured initial surface topography 530 and which, unlike the carriers of the above-described figures, is not substantially laterally stable. Upon, e.g., heating the article to a transition temperature, the surface topography of the adhesive changes to an essentially unstructured surface topography 515. Upon continued heating of the article to a higher transition temperature, the carrier undergoes dimensional change to produce a structured surface topography 535 (which induces a topography in the adhesive). This embodiment can be used to provide initial repositionable adhesion to a substrate surface, followed by increased adhesion to the surface as the adhesive assumes an essentially unstructured surface topography, followed by at least partial release from the substrate surface as the carrier assumes a structured surface topography.

Figure 6A:
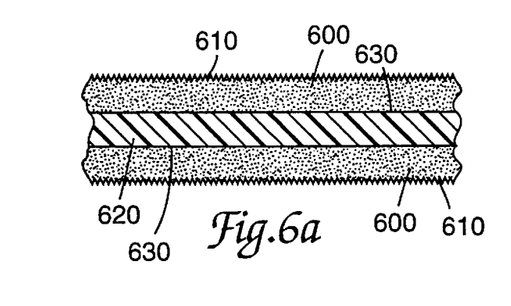
FIGS. 6a–6c show a sectional view of an embodiment of the article of the invention, which comprises a double-coated tape construction. The carrier has an initial surface topography (FIG. 6a) which is essentially unstructured (for both major surfaces), both layers of adhesive have an initial surface topography (FIG. 6a) which is structured, and the surface topographies of each change upon, e.g., heating the article to certain transition temperatures (FIGS. 6b–6c).
Figure 6B:
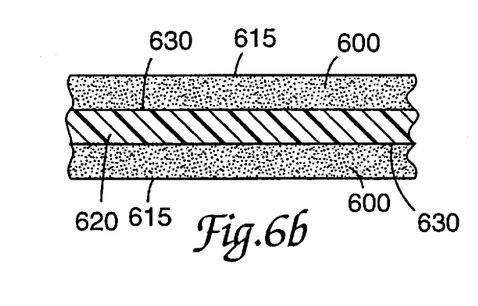
Figure 6C:
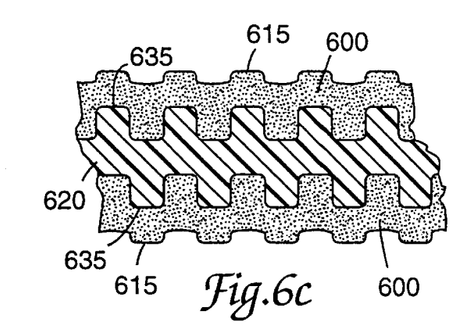

FIGS. 6a, 6b, and 6c show an embodiment of the article of the invention (e.g., a double-coated tape), wherein an adhesive 600 having a structured initial surface topography 610 has been applied to both major surfaces of a carrier 620 which has an essentially unstructured initial surface topography 630 on both major surfaces. Upon, e.g., heating the article to a transition temperature, the surface topography of the adhesive changes to an essentially unstructured surface topography 615. Upon continued heating of the article to a higher transition temperature, the surface topography of the carrier changes to a structured surface topography 635. The two adhesive layers 600 can comprise the same or different thermomorphic pressure-sensitive adhesives (and, in other similar embodiments, one of the adhesive layers 600 can comprise a non-thermomorphic pressure-sensitive adhesive). Similarly, the structured initial surface topographies 610 of the adhesive layers 600 can be the same or different in nature (and, in other similar embodiments, one can be initially unstructured and the other initially structured, or both can be initially unstructured). In this embodiment or other similar embodiments, the topographies of the two sides of the carrier can be the same or different in nature and degree of structure (e.g., two different carriers can be laminated together to provide a construction which can have either one or two carrier transition temperatures). This embodiment can be used to provide initial repositionable adhesion to two substrate surfaces, followed by increased adhesion to the surfaces as the adhesive assumes an essentially unstructured surface topography, followed by at least partial release from the substrate surfaces as the carrier assumes a structured surface topography.

Single-coated articles of the invention can further comprise a release coating, e.g., in the form of a low adhesion backsize for a tape construction. Useful materials for release coatings include, but are not limited to: silicones; epoxy silicones; fluorine-containing compounds, such as polyfluoropolyethers and fluorosilicones; polyvinyl carbamates; acetates; and acrylates. Various materials and compositions useful as release coatings are available commercially and are discussed in the literature. See, for example U.S. Pat. Nos. 2,532,011; 3,240,330; 3,318,852; 3,967,031; 3,978,274; 4,822,687; 4,889,753; 5,144,051; 5,217,805; and 5,273,805. See, also, U.S. Pat. No. 5,344,681 for a discussion of segmented transfer tapes, release coatings, etc.

Alternatively, the articles of the invention can further comprise a release liner. The release liner can optionally be a structured liner made from embossable or moldable materials having sufficient structural integrity to enable them to withstand the process of conveying structure to the adhesive and to then be cleanly removed from the structured adhesive film. Preferred such materials include, but are not limited to, plastics such as poly(ethylene), poly(propylene), polyesters, cellulose acetate, poly(vinyl chloride), and poly(vinylidene fluoride), as well as paper or other materials coated or laminated with such plastics. These embossable coated papers or thermoplastic films are often siliconized or otherwise treated to impart improved release characteristics. One or both sides of the liners could have such release characteristics.

Objects and advantages of this invention are further illustrated by the following examples, but the particular materials and amounts thereof recited in these examples, as well as other conditions and details, should not be construed to unduly limit this invention.

EXAMPLES

Example 1

An embossed polymer film was prepared by extruding an ethylene/propylene copolymer (KS-057, available from Himont U.S.A., Inc., Wilmington, Del.) from a single screw extruder (Model 1.75 TMC30; HPM Corporation, Mount Gilead, Ohio) equipped with a 4.4 cm diameter cylinder into the nip of a two roll embossing apparatus. The extruder, which was operated at 249° C. and a screw rotational speed of 20 rpm, delivered a sheet of molten copolymer through a 30.5 cm die having a 0.25 mm die gap horizontally into the nip of a two roll embossing apparatus which was positioned such that the width of the copolymer film entering the nip was approximately 15 cm. The embossing apparatus utilized a 25.4 cm diameter by 35.6 cm long steel roll (the embossing roll) which carried an embossing pattern (described below) and a similarly sized 75 durometer rubber roll which served as the chill roll. The steel roll was maintained at about 16° C., while the rubber roll, which was covered with a resilient material (described below), was cooled to 0° C. The copolymer film was embossed at a nip pressure of 55 kPa and a line speed of 3 m/min.

The embossing roll surface, which was generated by conventional photoengraving techniques on magnesium or a magnesium alloy, consisted of a square lattice array of circular posts (1.0 mm in diameter, 1.0 mm in height) which were spaced 1.9 mm on center.

The chill roll cover consisted of a 3.2 mm thick layer of polyurethane foam prepared essentially as described in U.S. Pat. No. 3,772,224 (Marlin et. al.) and U.S. Pat. No. 3,849,156 (Marlin et. al), the descriptions of which are incorporated herein by reference. The foam was prepared from a four part mix (A–D), the compositions of which were as follows:

Part A—100 parts of a mixture consisting of Niax™ 24-32 (97.77 parts) and Niax™ E-434 (2.23 parts) polyether polyols (available from OSI Specialties, Inc., Danbury, Conn.), dipropylene glycol (9.18 parts per hundred parts polyol (php); fragrance grade), Niax™ LC-5615 (3.74 php, a nickel catalyst composition available from OSI Specialities), aluminum trihydrate filler (54.59 php, ALCOA™ C-331, available from Aluminum Company of America, Pittsburgh, Pa.), and Hostaflam™ AP 442 flame retardant (16.38 php, available from Hoechst Celanese Corp., Charlotte, N.C.);

Part B—37.39 php of an isocyanate mixture consisting of 4,4'-diphenylmethane diisocyanate and a modified 4,4'-diphenylmethane diisocyanate (Rubinate™ 1920 available from ICI, Rubicon Chemicals, Geismer, La.);

Part C—4.77 php of a 70.9% (w/w) solution of a silicone surfactant (L-5614, available from OSI Specialities) in a polyether glycol (Niax™ E-351, available from Arco Chemical Co.); and Part D—6.71 php of an approximately 8% solids (w/w) dispersion of carbon black (Product No. 1607029, available from Spectrum Colors, Minneapolis, Minn.) in polyether glycol (Niax™ E-351).

Separate feed streams of the four parts were pumped into a 90 mm dual head Oakes Frother (available from E.T. Oakes Corp., Hauppauge, N.Y.) through an entrance manifold attached to the frother. The mixture was frothed by injecting high purity nitrogen through a capillary tube located at the entrance to the frother. The frothed mixture was processed through the frother at a mixing speed of 800 rpm and a discharge pressure of about 0.55 MPa and dispensed from an approximately 2.6 m×1.3 cm hose onto a polyester film and spread over the film using a knife coater (2.4 mm gap). The foam was cured by passage through a 3 chambered 13.7 m forced air oven at a line speed of 1.5–1.8 m/minute. The first chamber was maintained at 135° C. The second and third chambers were maintained at 154° C.

The embossed film was exposed to 20 Mrad of electron beam radiation at 250 kV and then flattened between a silicone rubber sheet (85 Durometer) and a stainless steel plate in a hydraulic press at 120° C. under approximately 500 kPa pressure and cooled to ambient temperature while the pressure was maintained. The flattened film was etched by immersing the film in chromic acid (250 g chromic acid/l deionized $H_2O$ containing sulfuric acid 2.5 g/l) for 10–15 minutes, rinsing with tap water (4–5 times), and drying in a circulating air oven at 40° C. for approximately 30 minutes.

Poly(octadecyl acrylate) was prepared in the following manner: in a 1 liter reaction vessel, 346.68 g of a 62.3 weight percent solution of octadecyl acrylate in ethyl acetate (216 g octadecyl acrylate) was combined with 0.64 g of Vazo™ 64 initiator (N,N'-azobis(isobutyronitrile); available from DuPont) and 193.32 g ethyl acetate. The contents of the reaction vessel were purged with nitrogen for 3 minutes to create an inert atmosphere. The vessel was then heated to 55° C. and maintained at that temperature for about 24 hours. As characterized by gel permeation chromatography (GPC), the resulting polymerized poly(octadecyl acrylate) product had a number average molecular weight of 99,788.

An adhesive composition was prepared by first dissolving poly(octydecyl acrylate) (2.5 g, prepared essentially as described above) in a monomer mixture consisting of isooctyl acrylate (42.75 g), acrylic acid (4.75 g), and hexanediol diacrylate (0.025 g), heating the resulting mixture with an infrared lamp, and stirring until all components were dissolved. Photoinitiator, Irgacure™ 651 (0.15 g; available from Sartomer Co., Exton, Pa.; 2-phenyl-2,2-dimethoxy acetophenone, was then added to the resulting solution, which was introduced into a polymerization bottle. Nitrogen gas was bubbled through the solution to remove $O_2$, and the polymer solution was partially polymerized to a polymer syrup by exposing the solution to ultraviolet (UV) irradiation from a low intensity UV light (350 nm black light, available from Sylvania, Danvers, Mass.).

The polymer syrup was poured onto a silicone rubber casting liner having a pattern of cube corner recesses 0.18 mm in depth with a base triangle having angles of 55 degrees, 55 degrees, and 70 degrees. The liner had been replicated from the surface of a cube corner reflective polycarbonate film, essentially as described in U.S. Pat. No. 4,588,258 (Hoopman), the description of which is incorporated herein by reference. The polymer syrup was covered by the etched flatten film (flattened structure side against the adhesive) and pressure applied to the film until the polymer syrup thickness over the land area of the mold was about 20 μm. The syrup was cured by exposure to low intensity UV irradiation, through the flattened film, from two General Electric 15 watt black lamps at a distance of 6 cm for 15 minutes. The silicone mold was removed and replaced with a flat silicone coated poly(ethylene terephthalate) release liner. The resulting laminate construction was heated in a circulating air oven for approximately 5 minutes and then placed on a bench, covered with an approximately 2 cm thick aluminum plate, which was at room temperature, and hand pressure applied to the plate for approximately 1 minute, as the laminate cooled to ambient temperature.

Application of the resulting tape construction to a glass slide, with finger pressure applied to the backing, produced approximately 80% adhesive "wet out" to the glass slide. Heating the tape construction to 65° C. developed the cube corner pattern in the adhesive layer, leading to partial debonding of the adhesive from the glass slide. Subsequent heating of the partially debonded tape to 120° C. redeveloped the post pattern of the tape backing which further reduced the adhesive contact with the glass slide, effectively debonding the tape from the glass. (Sequence illustrated in FIGS. 1a, 1b, and 1c.)

Example 2

A first temperature-responsive tape construction was prepared by knife coating an approximately 75 μm thick coating of the adhesive syrup of Example 1 onto a 50 μm thick polyethylene terephthalate film (Melinex™ 475/200, available from ICI Americas, Inc., Wilmington, Del.). The syrup was covered with a silicone coated polyethylene terephthalate (PET) release liner and cured essentially as described in Example 1. The PET release liner was removed and replaced with an embossed release liner (110 g/m² kraft paper coated with high density polyethylene (HDPE) on both sides (50 g/m² on the embossed side and 25 g/m² on the unembossed side), both sides being overcoated with a silicone release coating). The embossed side of the release liner had 25 cylindrical recesses per cm² in a square lattice array, each recess 75 μm in diameter and 50 μm deep. The resulting laminate was passed through a nip roller with one roll maintained at 65° C. and the other at 25° C. The laminate passed through the nip roller at a rate of 0.9 m/min and a force of 13 kg/cm, with the Melinex™ film wrapping against the 65° C. roll before the laminate entered the nip and the embossed liner wrapping against the 25° C. roll after exiting the nip. The wrap around each roll was sufficient to allow the adhesive to be heated prior to entering the nip and to cool after exiting the nip. The adhesive substantially duplicated the embossed pattern of the liner, except the posts were approximately 35 μm in height.

A second temperature-responsive, positionable tape construction was prepared using a male/female embossed polyvinylchloride film (PVC; available as POLYTHERM™ UG 45/60201 from Lake Crescent, Inc., Fairlawn, N.J.). This film had about 6 rounded top cylindrical protrusions (0.25 mm high, 1.27 mm wide at the base) per cm arranged in a square lattice array. The side of the film having the male protrusions was coated with an isooctyl acrylate/octyl acrylamide/sodium styrene sulfonate (87/12/1 weight ratio) based adhesive prepared essentially as described in Example 1 of U.S. Pat. No. 4,629,663 (Brown et. al.), the description of which is incorporated herein by reference. The adhesive (polymer latex) was coated to a wet thickness which was equivalent to the height of the protrusions. After drying, the tips of the protrusions were essentially void of adhesive and extended above the continuous adhesive layer.

The two resulting tape constructions, including their respective release liners, were laminated together using a 25 μm thick transfer adhesive. The transfer adhesive (which comprised 100 parts of an isooctyl acrylate/acrylic acid adhesive prepared essentially as described in Example 5 of U.S. Pat. No. 4,418,120 (Kealy et. al.), the description of which is incorporated herein by reference, and 1.1 parts of N,N'-bis-1,2-propylenisophthalamide) was applied to the uncoated face of the Melinex™ backing, and the resulting tape construction was applied to the uncoated face of the PVC backing, applying hand pressure with a 5 cm diameter hand held roller. The two release liners were removed, and the resulting laminated "double coated" tape construction was used to bond two glass slides together. Prior to heating to 65° C., the structured thermomorphic adhesive exhibited a slight cling to the glass and was repositionable, but, after being heated to 65° C., the adhesive completely "wet out" the glass slide. The opposite face of the double coated tape construction was positionable until it was heated to 150° C., at which point the backing structure retracted, allowing the adhesive to contact the glass slide and adhere to it.

Example 3

A 0.62 mm (25 mil) thick polyethylene film (Dowex™ 2035) was extruded using an extrusion process similar to that described in Example 1, except that the polyethylene was extruded onto a smooth steel roll and a foam-covered silicone roll. The resulting film was exposed to 15 Mrad of electron beam energy at 200 KV, after which it was tentered at 115° C. with a 2× stretch in both the down-web and cross-web directions. Following tentering, the film was acid etched essentially as described in Example 1.

Polymer syrup, prepared essentially as described in Example 1 and heated to 45° C., was poured into a silicone mold, also essentially as described in Example 1, which had also been heated to 45° C. The syrup was covered with the etched film backing (with the foam mold side to the adhesive), which was, in turn, covered with a 3 mm glass plate, also at 45° C. Hand pressure was applied to the glass plate to expel air and force the adhesive into a thin film (<25 microns over the land area of the mold). The adhesive was cured essentially as described in Example 1, except that the cure time was 30 minutes. On removal from the mold, the cured adhesive was observed to have duplicated the cube corner structure of the silicone mold.

A portion of the resulting structured adhesive tape construction was placed between two silicone coated polyethylene terephthalate release liners, and the resulting laminate was placed between the 3 and 6 mm thick glass plates and the entire assembly heated to 65° C. in a circulating air oven for approximately 30 minutes. The assembly was removed from the oven and placed on a bench top, and a pressure of approximately 15 g/cm² was applied to the 3 mm top glass plate and maintained until the assembly had cooled to ambient temperature to flatten the cube corner structure of the adhesive.

Application of the resulting tape construction to a glass slide using finger pressure on the backing produced >80% "wet out" of the adhesive on the slide. Some edge delamination was observed after heating the tape to 65° C., but adhesive contact of the majority of the tape remained unchanged. On further heating to 120° C., however, the film backing began retracting to its original shape/dimensions (i.e., pre-tentering dimensions), causing the adhesive to substantially totally delaminate from the glass plate. The molded cube corner structure was observed to recover at the delamination boundary.

Various modifications and alterations of this invention will become apparent to those skilled in the art without departing from the scope and spirit of this invention.

What is claimed is:

1. A temperature-responsive adhesive article comprising (a) a temperature-responsive carrier capable of changing its shape at a first transition temperature; and (b) a thermomorphic pressure-sensitive adhesive on at least a portion of at least one surface of said carrier, said thermomorphic pressure-sensitive adhesive comprising a continuous crystalline polymer component comprising polymerized units of at least one monomer selected from the group consisting of acrylates and methacrylates and a discrete crosslinked elastomeric polymer component comprising polymerized units of at least one monomer selected from the group consisting of acrylates and methacrylates and being capable of changing its shape at a second transition temperature.

2. The article of claim 1 wherein said carrier comprises at least one polymer.

3. The article of claim 2 wherein said carrier comprises at least one crosslinked polymer.

4. The article of claim 2 wherein said polymer is selected from the group consisting of poly(ethylene); poly(propylene); poly(vinyl chloride); poly(vinylidene fluoride); polyester; polyamide; cellulose acetate; ethyl cellulose; poly(ethyl acrylate); and copolymers of ethylene with acrylic acid, tetrafluoroethylene, propylene, butene, vinyl acetate, or ethyl acrylate.

5. The article of claim 1 wherein said carrier is a film having a first major surface and a second major surface.

6. The article of claim 5 wherein said film is flexible.

7. The article of claim 5 wherein said film in either its initial or final state has at least one of said first and second major surfaces comprising a recessed surface portion and a raised surface portion therein.

8. The article of claim 5 wherein said film bears stand-offs on at least a portion of at least one of said first and second major surfaces.

9. The article of claim 1 wherein said carrier is substantially laterally stable.

10. The article of claim 1 wherein said carrier is not substantially laterally stable.

11. The article of claim 1 wherein said first transition temperature and said second transition temperature are the same.

12. The article of claim 1 wherein said first transition temperature and said second transition temperature are different.

13. The article of claim 12 wherein said first transition temperature is higher than said second transition temperature.

14. The article of claim 12 wherein said second transition temperature is higher than said first transition temperature.

15. The article of claim 1 wherein both said temperature-responsive carrier and said thermomorphic pressure-sensitive adhesive exhibit more than one transition temperature.

16. The article of claim 1 further comprising a release coating on at least a portion of at least one surface of said carrier.

17. The article of claim 6 in the form of a tape.

18. The article of claim 17 further comprising a release coating on at least a portion of at least one major surface of said film.

19. The article of claim 18 wherein said release coating is on said second major surface and said thermomorphic pressure-sensitive adhesive is on said first major surface.

20. The article of claim 17 in the form of a double-coated tape, wherein both said first major surface and said second major surface of said film bear pressure-sensitive adhesive on at least a portion thereof.

21. The article of claim 20 wherein said pressure-sensitive adhesive on both said first and second major surfaces is thermomorphic.

22. The article of claim 20 wherein said pressure-sensitive adhesive on said first major surface is thermomorphic and on said second major surface is not thermomorphic.

23. The article of claim 1 wherein the initial shape of said carrier and the initial shape of said thermomorphic pressure-sensitive adhesive comprise a structured surface topography.

24. The article of claim 1 wherein the initial shape of said carrier and the initial shape of said thermomorphic pressure-sensitive adhesive comprise an essentially unstructured surface topography.

25. The article of claim 1 wherein the initial shape of said carrier comprises a structured surface topography and the initial shape of said thermomorphic pressure-sensitive adhesive comprises an essentially unstructured surface topography.

26. The article of claim 1 wherein the initial shape of said carrier comprises an essentially unstructured surface topography and the initial shape of said thermomorphic pressure-sensitive adhesive comprises a structured surface topography.

27. The article of claim 13 wherein the initial shape of said carrier comprises an essentially unstructured surface topography and the initial shape of said thermomorphic pressure-sensitive adhesive comprises a structured surface topography.

28. A temperature-responsive adhesive article comprising (a) a temperature-responsive polymer film which comprises polymerized units of ethylene and which is capable of changing its shape at a first transition temperature; and (b) a thermomorphic pressure-sensitive adhesive on at least a portion of at least one surface of said polymer film, said thermomorphic pressure-sensitive adhesive comprising a continuous crystalline polymer component comprising polymerized units of alkyl acrylate and a discrete crosslinked elastomeric polymer component comprising polymerized units of alkyl (meth)acrylate and acrylic acid, and said thermomorphic pressure-sensitive adhesive being capable of changing its shape at a second transition temperature which is lower than said first transition temperature.

29. The article of claim 28 wherein said alkyl acrylate is octadecyl acrylate.

30. The article of claim 28 wherein said alkyl (meth)acrylate is isooctyl acrylate.

31. The article of claim 28 wherein said alkyl acrylate is octadecyl acrylate and said alkyl (meth)acrylate is isooctyl acrylate.

* * * * *